(12) United States Patent
Young

(10) Patent No.: US 11,212,822 B2
(45) Date of Patent: Dec. 28, 2021

(54) SYSTEMS AND METHODS FOR MANAGING SERVICE LEVEL AGREEMENTS OVER NETWORK SLICES

(71) Applicant: Verizon Patent and Licensing Inc., Arlington, VA (US)

(72) Inventor: Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 140 days.

(21) Appl. No.: 16/693,053

(22) Filed: Nov. 22, 2019

(65) Prior Publication Data

US 2021/0160897 A1 May 27, 2021

(51) Int. Cl.
*H04W 28/24* (2009.01)
*H04L 12/24* (2006.01)
*H04W 72/12* (2009.01)

(52) U.S. Cl.
CPC ..... *H04W 72/1257* (2013.01); *H04L 41/0893* (2013.01); *H04L 41/5012* (2013.01); *H04W 28/24* (2013.01)

(58) Field of Classification Search
CPC ... H04L 41/0896; H04L 41/142; H04L 41/16; H04L 41/147; H04L 41/0893; H04L 41/5003; H04L 41/5009; H04L 41/5012; H04L 41/5019; H04L 43/16; H04L 41/5022; H04L 41/5054; H04L 43/0888; H04L 47/787; H04L 24/02; H04L 24/04; H04L 28/24; H04L 72/1257; H04L 72/0486
See application file for complete search history.

(56) References Cited

U.S. PATENT DOCUMENTS

| 9,401,851 B2* | 7/2016 | Kakadia | H04L 41/5009 |
| 10,349,431 B2* | 7/2019 | Arnold | H04W 72/1231 |
| 10,965,558 B2* | 3/2021 | Jayakumar | H04L 41/14 |
| 11,026,106 B2* | 6/2021 | Bor-Yaliniz | H04W 24/04 |
| 2018/0152958 A1* | 5/2018 | Arnold | H04L 41/5025 |
| 2020/0044943 A1* | 2/2020 | Bor-Yaliniz | H04L 41/18 |
| 2020/0186411 A1* | 6/2020 | Ravichandran | H04L 41/0668 |
| 2021/0037544 A1* | 2/2021 | Andrews | H04W 72/1257 |

OTHER PUBLICATIONS

3GPP, "5G; System Architecture for the 5G System (3GPP TS 23.501 version 15.2.0 Release 15)", Dec. 15, 2016, 219 pages.
3GPP, "5G; Management and orchestration; 5G Network Resource Model (NRM); Stage 2 and stage 3 (3GPP TS 28.541 version 15.0.1 Release 15)", Dec. 31, 2017, 226 pages.

* cited by examiner

*Primary Examiner* — Ahmed Elallam

(57) ABSTRACT

A network node may obtain a function for determining a weighted sum of service level agreement (SLA) violations within a coverage area associated with the network node. The network node may obtain weight values corresponding to respective network slices of a plurality of network slices operating within the coverage area associated with the network node. The network node may provide, to one or more devices connected via the plurality of network slices, resource grants according to a communication schedule, wherein the communication schedule is determined to minimize the weighted sum of the SLA violations. The network node may determine values of the SLA violations for the plurality of network slices during a time period and provide, to a network node controller, the values of the SLA violations for the plurality of network slices.

20 Claims, 7 Drawing Sheets

400 ⟶

SYSTEMS AND METHODS FOR MANAGING SERVICE LEVEL AGREEMENTS OVER NETWORK SLICES

BACKGROUND

Network slicing is a network architecture model in which logically distinct network slices operate using common network infrastructure. For example, several network slices may operate as isolated end-to-end networks customized to satisfy different target service standards for different types of applications and/or communications. Network slicing may be useful for networks that are designed to efficiently provide communications for different types of services with different service standards.

DETAILED DESCRIPTION OF PREFERRED EMBODIMENTS

Figure 1A:
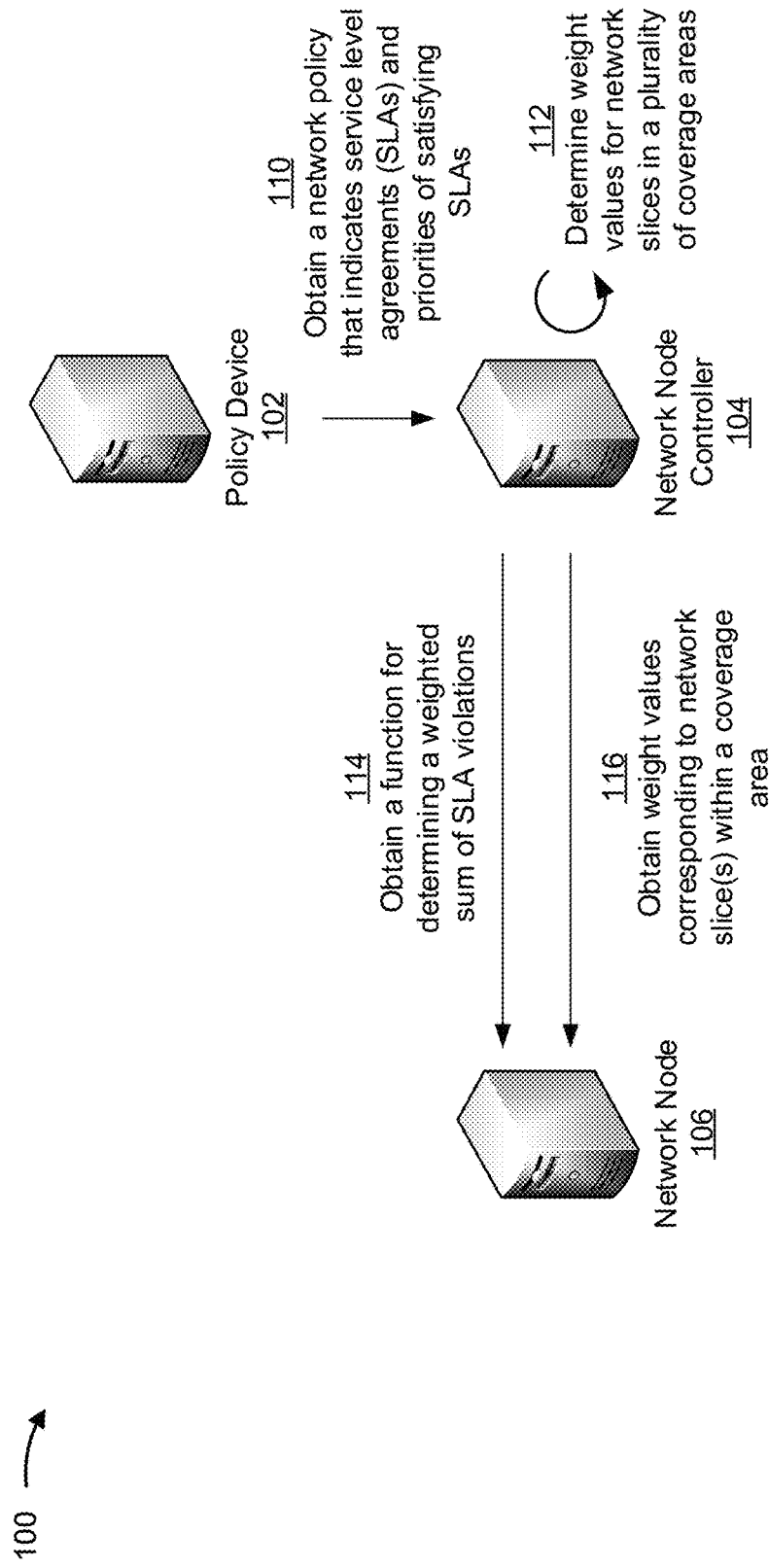
FIGS. 1A-1C are diagrams of one or more example implementations described herein.

The following detailed description of example implementations refers to the accompanying drawings. The same reference numbers in different drawings may identify the same or similar elements.

A service level agreement (SLA) provides target service standards that a service provider agrees to provide to a customer. For example, a provider of a network may agree to host a service for a customer (e.g., an application service provider, a user device that subscribes to the wireless network, and/or the like) with an agreement regarding minimum throughput, latency budgets, delivery reliability, and/or the like. For some customers, satisfying the target service standard may be required to reliably use a service (e.g., controlling an unmanned vehicle, performing robotic surgery, and/or the like). For some customers, satisfying the SLA may be requested by the customer (e.g., in a service level request (SLR)) to provide users with a positive experience so the customer's service can be successfully marketed to new users.

However, because wireless networks (e.g., cellular networks) operate in a variable environment (e.g., with moving connected devices, frequent addition and removal of connected devices, handoffs of connected devices between network nodes, changes in weather, and/or the like), providers of wireless networks may not guarantee that the wireless networks will comply with a strict SLA all of the time and for all connected devices. This is at least one reason why providers of wireless networks may not agree to SLAs, or if SLAs are agreed to, customers may not rely upon satisfying the target service standards of the SLAs. This may prohibit some potential customers from allowing application services to be provided using communication links over wireless networks.

According to some implementations described herein, a network node controller may obtain a network policy that indicates SLAs. One or more of the SLAs may define an SLA violation as failing to satisfy a target service standard during a time period (e.g., for a threshold portion of timing intervals for communication links associated with a network (e.g., a wireless network), for a threshold portion of communication links (e.g., idle, inactive, or connected) associated with the network, for a threshold portion of devices (e.g., idle, inactive, or connected) connected to the network, and/or the like). The network policy may also indicate priorities of satisfying SLAs by a plurality of network slices.

By providing SLAs with flexibility to account for operation in a variable environment, customers may design services that can be used reliably and with a positive experience based on the target service standards of the SLAs in a wireless network. This may allow connected devices to use services (e.g., services that rely on mission critical communications) when a connection type with fewer variables is not available (e.g., for an unmanned vehicle, a surgical robot at a roadside incident, and/or the like).

The network node controller may manage a coverage region that includes a plurality of coverage areas. The network slices may be operated in a plurality of coverage areas that are managed by a plurality of network nodes. To optimize compliance with SLAs for each of the network slices in each of the coverage areas according to the priorities of satisfying SLAs of the network, the network node controller may generate or obtain a function for determining a total weighted sum of SLA violations for the network slices in the coverage region. The network node controller may assign weights to each of the network slices (e.g., to multiply with values of SLA violations in respective network slices) to correspond with the indicated priorities of satisfying SLAs of the network. The network node controller may also determine a set of weights (which may be different from the weights for the total weighted sum of SLA violations) for each network slice in each coverage area of the coverage region.

A network node may obtain (e.g., via the network node controller) a function for determining a weighted sum of SLA violations within a coverage area associated with the network node. The network node may also obtain (e.g., via the network node controller) weight values corresponding to respective slices of a plurality of network slices operating within the coverage area associated with the network node. The weight values may be used in the function to weight the SLA violations in the plurality of network slices. The weight values may be based on priorities of satisfying SLAs by the network slices in the coverage area. The network node may determine a communication schedule, for communicating with connected devices, to minimize the weighted sum of SLA violations within the coverage area (e.g., by assigning portions of available communication resources to satisfy the SLAs of the network slices with priorities based on the weight values).

The network node may determine values of SLA violations (e.g., not weighted values) for the plurality of network slices and provide the values of SLA violations to the network node controller. Based on the total weighted sum of SLA violations for the coverage region, the network node controller may provide updated weight values to the network node.

By providing weight values to different network slices of the coverage region, the network node controller may optimize the network in the coverage region for satisfying SLAs for as many network slices as possible, with prioritization for satisfying particular SLAs of network slices (e.g., when not all network slices can comply with the SLAs) according to the network policy. By providing weight values to network slices in different coverage areas (e.g., with allowance of a weight value of a network slice to be different in one coverage area than the same network slice in a different coverage area), the network node controller can optimize the network in the coverage region for satisfying SLAs with additional granularity.

By optimizing the network for satisfying SLAs, customers can provide services, over the network in the coverage region, with target standards that are satisfied based on priorities of the network slice with which the service is associated. This means that the customers may provide services that otherwise may not be able to be reliably provided via a wireless network. Additionally, the network nodes may be able to efficiently schedule communication resources to satisfy the target service standards according the SLAs and the weighting of SLA violations by the network slices. This can avoid requiring the network nodes to allocate an unnecessarily large amount of communication resources for high-priority network slices (e.g., for redundant communications) to ensure that a strict target service standard is satisfied (e.g., for every connected device at all times).

Figure 1B:
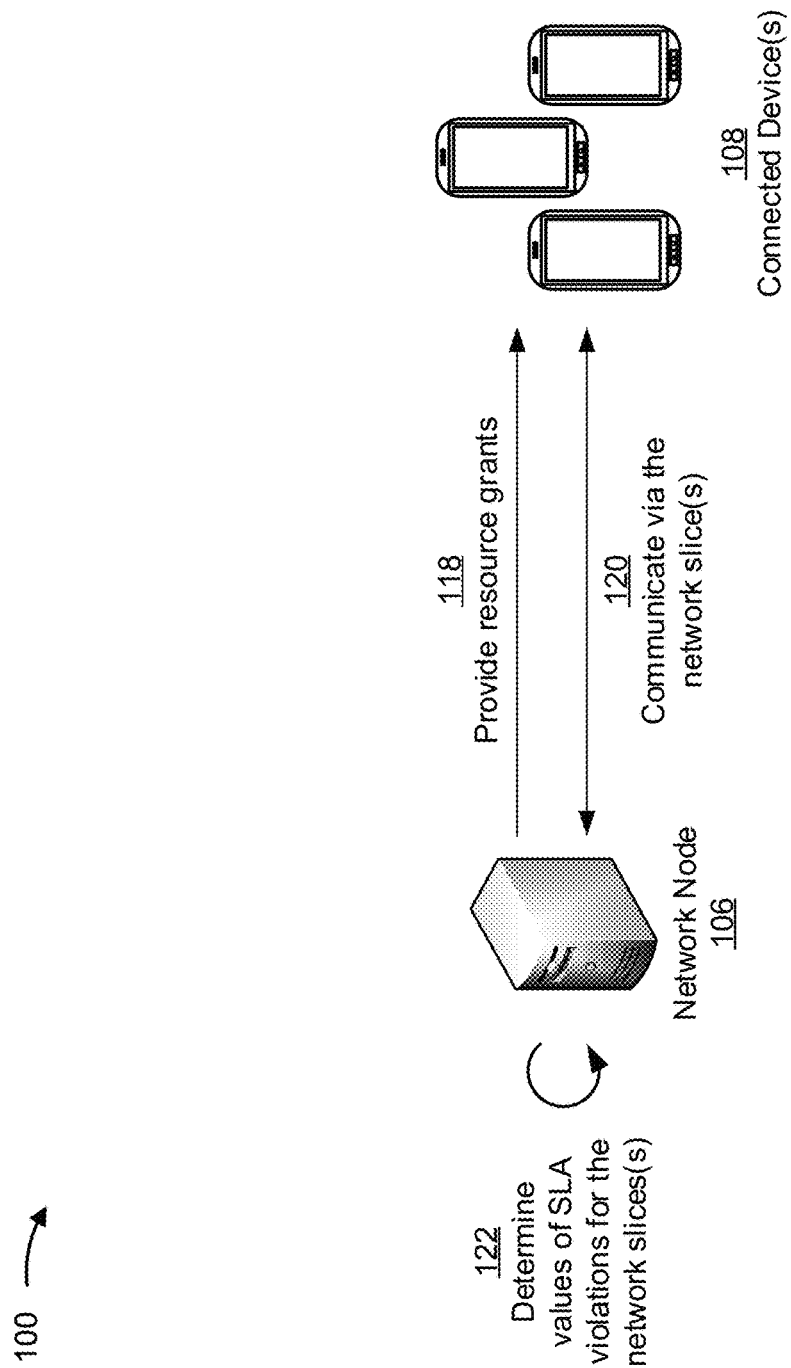
Figure 1C:
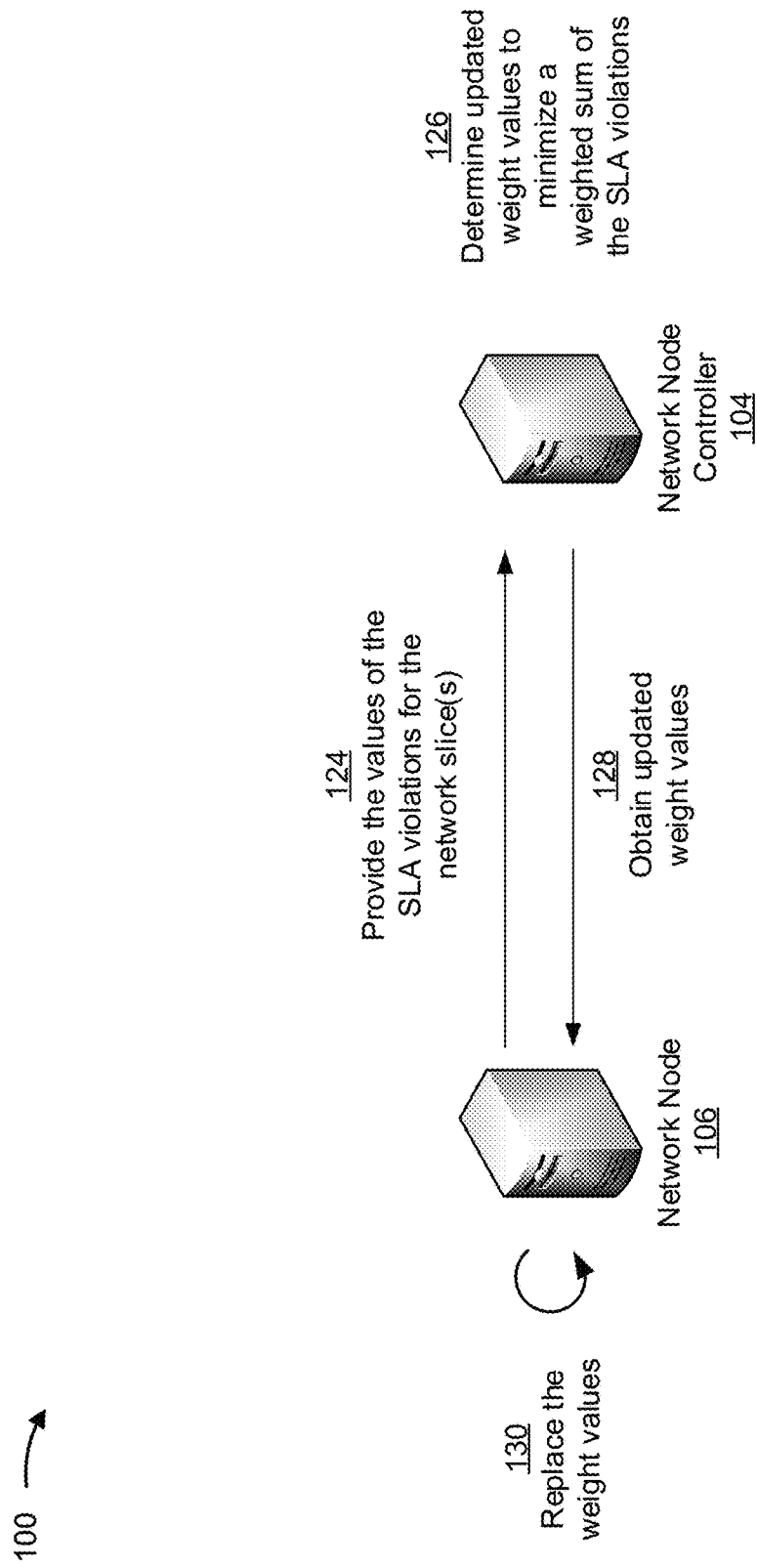

FIGS. 1A-1C are diagrams of one or more example implementations 100 described herein. As shown in FIGS. 1A-1C, the example implementation(s) 100 may include a policy device 102, a network node controller 104, a network node 106, one or more connected devices 108, and/or the like. The network node controller 104 and/or the network node 106 may operate according to a radio access technology that allows for network slicing to permit a plurality of logical networks to operate (e.g., via multiplexing) on common network infrastructure (e.g., base stations, routers, a core network of network devices, communication links between network devices, and/or the like). For example, the network node controller 104 and/or the network node 106 may operate a plurality of network slices according to a fifth generation new radio protocol.

As shown by reference number 110, the network node controller 104 may obtain, from a policy device 102, a network policy that indicates SLAs and priorities of satisfying SLAs. For example, the policy may indicate that a first network slice of a plurality of network slices should be given a relatively high priority to comply with an SLA associated with the first network slice, whereas a second network slice of the plurality of network slices should be given a relatively low priority to comply with an SLA associated with the second network slice.

In some implementations, one or more of the SLAs may define a threshold portion of timing intervals during which communication links, using an associated network slice of the plurality of network slices, satisfy a target service standard. The one or more SLAs may define a violation of the SLA as failing to satisfy the target service standard for a threshold portion of a particular timing interval. In other words, an SLA violation may occur when a particular communication link over a particular network slice fails to satisfy the target service standard of the SLA for a portion of time within the particular timing interval that satisfies an SLA violation threshold. In these implementations, the one or more SLAs may prioritize reliability of the particular network slice complying with the SLAs for all of the one or more connected devices 108.

In some implementations, one or more of the SLAs may define a threshold portion of communication links (e.g., idle, inactive, or connected), using a particular network slice of the plurality of network slices, that satisfy a target service standard. The one or more SLAs may define a violation of an SLA as failing to satisfy the target service standard for the threshold portion communication links during a particular timing interval. In other words, an SLA violation may occur when a portion of all communication links using a particular network slice fail to satisfy the target service standard of the SLA for the particular timing interval. In these implementations, the one or more SLAs may prioritize reliability of the particular network slice complying with the one or more SLAs for at least a threshold portion of the one or more connected devices 108.

By providing SLAs with flexibility to account for a variable environment that is inherent in a wireless network, customers may design services that can be used reliably and that can provide a positive experience for users based on an expectation of complying with service target standards as defined in the SLAs. This may allow connected devices to use services that are sensitive to violations of SLAs when a connection with fewer variables is not available.

The one or more SLAs may differ among the plurality of network slices. For example, a first SLA for a first network slice may include a first target service standard and a first threshold associated with a violation of the first SLA, whereas a second SLA for a second network slice may include a second target service standard and a second threshold associated with a violation of the second SLA. The first target service standard may be different from the second target service standard, though not necessarily, and/or the first threshold associated with a violation of the first SLA may be different from the second threshold associated with a violation of the second SLA, though not necessarily.

In some implementations, the SLA for a particular slice may differ among different coverage areas. For example, an SLA for a network slice associated with video streaming services may have a target service standard for throughput that is higher in a first coverage area in a metropolitan area than a target service standard for throughput in a second coverage area in a rural area. This may be based on infrastructure that is available, a network environment, expectations of users, and/or the like.

As shown by reference number 112, the network node controller 104 may determine weight values for a plurality of network slices in a plurality of coverage areas, managed by a plurality of network nodes, included in a coverage region that is managed by the network node controller 104. In some implementations, to assist with determining the weight values for the plurality network slices, the network node controller 104 may generate or obtain a function for determining a total weighted sum of SLA violations for the plurality of network slices in the coverage region. The function may include coverage region weight values for respective network slices of the plurality of network slices in the coverage region. Equation 1 shows an example of the function for determining a total weighted sum of SLA violations for the plurality of network slices in the coverage region:

$$NSV = \sum_{j}^{m} \sum_{i=1}^{n} (RW_j \times SV_{ij}) \qquad (1)$$

where NSV is the total weighted sum of SLA violations for the plurality of network slices in the coverage region having network slices j to m and coverage areas i to n, RW is a coverage region weight for a network slice j, SV is an amount or quantity of SLA violations in coverage area i for network slice j. The network node controller 104 may determine the weight values for the plurality of network slices in the plurality of coverage areas to minimize the function.

Additionally, or alternatively, the network node controller 104 may determine the weight values for the plurality of network slices in the plurality of coverage areas to minimize a total sum of SLA violations for one or more of the plurality of network slices within the coverage region. For example, equation 2 is an example of a function that the managing network node 104 may use to determine a total sum of SLA violations for each network slice ($NSV_j$):

$$NSV_j \Sigma_{i=1}^{n}(SV_{ij}) \qquad (2)$$

In some implementations, an amount of violation of a particular SLA in one coverage area may be different from an amount of violation of the particular SLA violation in another coverage area. Differences in amounts of violations may be a result of the network node controller 104 providing different weight values for a network slice associated with the SLA violation within different coverage areas. Additionally, or alternatively, the differences in amounts of violations may be a basis for the network node controller 104 to provide different weight values for the network slice within different coverage areas.

As shown by reference number 114, the network node 106 may obtain a function for determining a weighted sum of SLA violations within a coverage area associated with the network node 106. Equation 3 is an example of the function:

$$CSV_i = \Sigma_{j=1}^{m}(W_{ij} \times SV_{ij}) \qquad (3)$$

where CSV is the weighted sum of SLA violations in coverage area i having network slices j to m, $W_{ij}$ is a weight for slice j in coverage area i, and $SV_{ij}$ is an amount or quantity of SLA violations for slice j in coverage area i.

In some implementations, one or more of the described functions (e.g., the functions in equation 1, equation 2, or equation 3) may be modified. For example, weight values assigned to network slices (e.g., assigned to violations of SLAs) may be modified based on a change in the network policy, a change in network conditions, a deployment of additional network infrastructure (e.g., to create new coverage areas), an addition of network slices, and/or the like. In some implementations, the network node controller 104 may modify one or more of the described functions based on receiving input from a user, receiving a change in network policy from the policy device 102, machine learning processes and/or artificial intelligence, and/or the like.

In some implementations, a function modification model may be trained by the network node controller 104 or another device. The function modification model may be trained using, as training data, historical weight values assigned to the plurality of network slices in the plurality of coverage areas, parameters associated with the historical weight values (e.g., traffic on the plurality of network slices, a time of day, a day of the week, a date that is a holiday, and/or the like), and historical outcomes of the historical weight values (e.g., the total weighted sum of SLA violations, the total sum of SLA violations for one or more network slices, and/or the like). The network node controller 104 may use the functional modification model to select and/or update weight values for the plurality of network slices in the plurality of coverage areas to minimize the total weighted sum of SLA violations for the plurality of network slices in the coverage region, the total sum of SLA violations for one or more network slices, and/or the like.

As shown by reference number 116, the network node 106 may obtain weight values corresponding to one or more network slices within the coverage area. In some implementations, the weight values may be different for respective network slices of the one or more network slices within the coverage area. Additionally, the weight value for a particular network slice may be different from a weight value for the particular network slice in another coverage area managed by another network node 106.

As shown in FIG. 1B, and by reference number 118, the network node 106 may provide one or more resource grants to the one or more connected devices 108 so the one or more connected devices 108 may communicate via one or more communication links with the network node 106. In some implementations, the network node 106 may determine a communication schedule, identifying the one or more resource grants, to minimize the weighted sum of the SLA violations within the coverage area. For example, if communication resources are limited, a scheduler of the network node 106 may identify one or more resource grants to ensure that a first network slice associated with a highest weight value has sufficient communication resources to comply with the associated SLA, then identify one or more resource grants to ensure that a second network slice associated with a second highest weight value has sufficient communication resources to comply with the associated SLA, continuing until the communication resources have all been used in resources grants. If the communication resources have all been used before the network node 106 is able to ensure that all network slices have sufficient communication resources to comply with associated SLAs, then the lowest priority network slice, having the smallest weight value, will violate an associated SLA, but because of the weighting, the weighted sum of the SLA violations may still result in a minimized value.

As shown by reference number 120, the one or more connected devices 108 may communicate with the network node 106 over one or more communication links via one or more of the plurality of network slices. In some implementations, a particular connected device of the one or more connected devices 108 may communicate via two or more of the plurality of network slices simultaneously.

As shown by reference number 122, the network node 106 may determine values of SLA violations for the plurality of network slices. In some implementations, the network node 106 may modify a subsequent communication schedule, based on the values of the SLA violations for the plurality of network slices during the time period, to minimize the weighted sum of SLA violations for a subsequent time period. For example, if a first network slice had one or more SLA violations during the period, and the first network slice is associated with a relatively high weight value, the network node 106 may modify the subsequent communication schedule to provide additional communication resources for the first network slice. In some implementations, the first network slice may have violated the SLA based on variables within the network in the coverage area (e.g., weather, devices connecting and/or disconnecting from the first network slice, and/or the like).

As shown in FIG. 1C, and by reference number 124, the network node 106 may provide the values of the SLA violations for the plurality of network slices. The values of the SLA violations may be unweighted values so that the network node controller 104 may apply different weightings to the SLA violations based on coverage area weightings associated with the network slices. In some implementations, the network node 106 may provide the values of the SLA violations to the network node controller 104 on a periodic basis (e.g., after a time period), based on a weighted sum of SLA violations in the coverage area satisfying a threshold, based on receiving a request from the network node controller 104 to provide the values of the SLA violations, and/or the like.

In some implementations, the periodic basis for the network node 106 providing the values of the SLA violations to the network node controller 104 may be less frequent than a frequency at which the network node 106 modifies the communication schedule to minimize the weighted sum of SLA violations for subsequent time periods based on values of the SLA violations for the plurality of network slices during a previous time period. For example, the network node 106 may modify the communication schedule to modify an amount of communication resources provided for each of the network slices with a period between about 0.1 seconds and 1 minute. The network node 106 may provide the values of the SLA violations to the network node controller 104 with a period of between about 10 seconds to 1 hour.

As shown by reference number 126, the network node controller 104 may determine updated weight values to minimize a weighted sum of the SLA violations of the plurality of network slices in the coverage region. In some implementations, the network node controller 104 may determine the updated weight values based on a cumulative amount of SLA violations for a particular network slice. For example, if a lowest priority network slice that is associated with a lowest weight value has repeated SLA violations, the network policy may indicate that the lowest priority network slice should advance in priority to avoid or reduce additional repeated SLA violations. In some implementations, the network node controller 104 may determine the updated weight values based on a change in the network policy, a change in definitions of the plurality of network slices (e.g., types of applications that are assigned to respective network slices), traffic on the plurality of network slices, a time of day, a day of the week, a date that is a holiday, and/or the like.

As shown by reference number 128, the network node 106 may obtain the updated weight values. For example, the network node 106 may receive the updated weight values, from network node controller 104, that are associated with the network slices in the coverage area managed by the network node 106. The updated weight values may be used as replacements to the weight values in the function to minimize the weighted sum of SLA violations in the coverage area managed by the network node 106. The updated weight values may change respective weights of the plurality of network slices.

As shown by reference number 130, the network node 106 may replace the weight values in the function to minimize the weighted sum of SLA violations in the coverage area managed by the network node 106. The network node 106 may modify subsequent communication schedules and/or subsequent resource grants based on the updated weight values. For example, the network node 106 may provide an increased amount of communication resources, communication resources of a different bandwidth, resources of a different numerology, and/or the like to a network slice for which an associated weight value increased (in the updated weight values) relative to the associated weight value used in previous communication schedules.

By optimizing the network in the coverage region to satisfy SLAs, customers can provide services, over one or more of the plurality of network slices in the coverage region, with target standards that are satisfied based on priorities of the network slice as defined in the network policy. This means that the customers may provide services, using the network slices, that otherwise may not be able to be reliably provided via a wireless network. Additionally, one or more network nodes managed by the network node controller 104 may be able to efficiently schedule communication resources to satisfy the target service standards according the SLAs and the weighting of SLA violations by the network slices. This can avoid allocating an unnecessarily large amount of communication resources for high-priority network slices (e.g., for redundant communications) to ensure that a strict target service standard is satisfied (e.g., for every connected device at all times).

As indicated above, FIGS. 1A-1C are provided as one or more examples. Other examples can differ from what is described with regard to FIGS. 1A-1C. Additionally, the number and arrangement of devices shown in FIGS. 1A-1C are provided as one or more examples. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of the example implementation(s) 100 may perform one or more functions described as being performed by another set of devices of the example implementation(s) 100.

Figure 2:
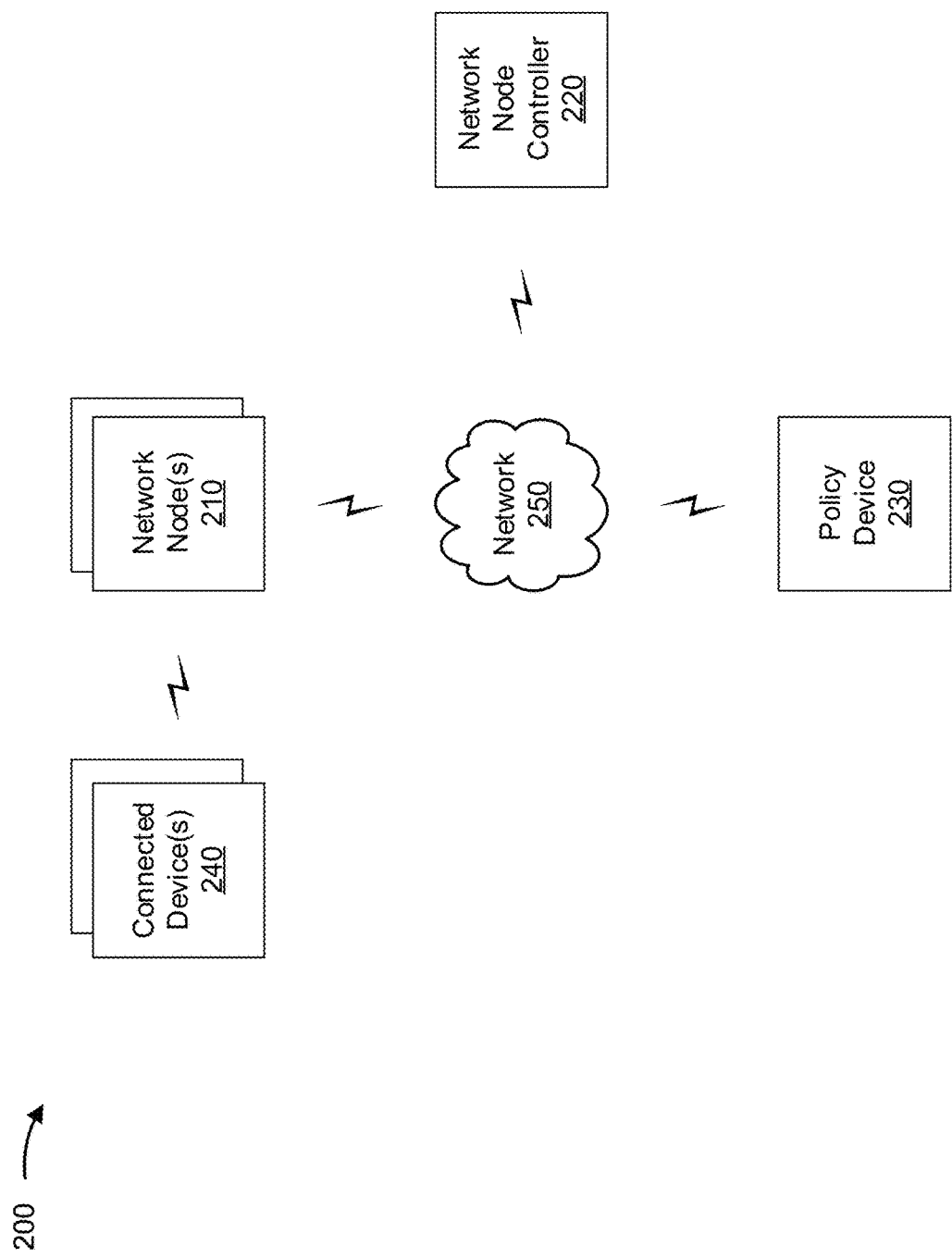
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more network nodes 210 (referred to herein individually as network node 210 or collectively as network nodes 210), a network node controller 220, a policy device 230, one or more connected devices 240 (referred to herein individually as connected device 240 or collectively as connected devices 240), and a network 250. Devices of environment 200 may interconnect via wired connections, wireless connections, or a combination of wired and wireless connections.

Network node 210 (e.g., the network node 106) includes one or more devices capable of communicating with connected device(s) 240 using a cellular radio access technology (RAT). Network node 210 may provide infrastructure for providing one or more network slices. For example, network node 210 may include a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Network node 210 may transfer traffic between connected device(s) 240 (e.g., using a cellular RAT), other base stations (e.g., using a wireless interface or a backhaul interface, such as a wired backhaul interface), network node controller 220, network 250, and/or the like. Network node 210 may provide one or more cells that cover geographic areas. Some network nodes 210 may be mobile base stations. Some network nodes 210 may be capable of communicating using multiple RATs.

In some implementations, network node 210 may perform scheduling and/or resource management for connected device(s) 240 connected to network node 210 via communication links (e.g., connected device(s) 240 covered by a cell provided by network node 210). In some implementations, network node 210 may be controlled or coordinated by a network controller, which may perform load balancing, network-level configuration, and/or the like. The network controller may communicate with network nodes 210 via a wireless or wireline backhaul. In some implementations, network node 210 may include a network controller, a self-organizing network (SON) module or component, or a similar module or component. In other words, a network node 210 may perform network control, scheduling, and/or network management functions (e.g., for other network nodes 210 and/or for uplink, downlink, and/or sidelink communications of connected device(s) 240 covered by the network node 210). In some implementations, network node 210 may include a central unit and multiple distributed units. The central unit may coordinate access control and communication with regard to the multiple distributed units. The multiple distributed units may provide connected device(s) 240 and/or other network nodes 210 with access to network 250.

Network node controller 220 (e.g., the network node controller 104) includes one or more devices capable of receiving, storing, generating, processing, forwarding, and/or transferring information, such as network policies, weight values to associate with network slices and/or coverage areas, functions for determining weighted sums of SLA violations, and/or the like. In some implementations, network node controller 220 may include a communication interface that allows network node controller 220 to receive information from and/or transmit information to other devices in environment 200. For example, network node controller 220 may use the communication interface to provide weight values to network node(s) 210, receive values of the SLA violations from network node(s) 210, and/or the like. In some implementations, network node controller 220 comprises a network-wide orchestrator to orchestrate prioritization of network slices throughout the plurality of coverage areas of the network.

Policy device 230 (e.g., the policy device 102) includes one or more devices capable of receiving, storing, generating, processing, forwarding, and/or transferring information, such as network policies and/or the like. In some implementations, policy device 230 may include a communication interface that allows policy device 230 to receive information from and/or transmit information to other devices in environment 200. For example, policy device 230 may use the communication interface to provide network policies to network node controller 104.

Connected device(s) 240 (e.g., the one or more connected devices 108) include one or more devices capable of receiving, generating, storing, processing, and/or providing information associated with communicating via one or more network slices provided by network node 210. For example, connected device 240 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
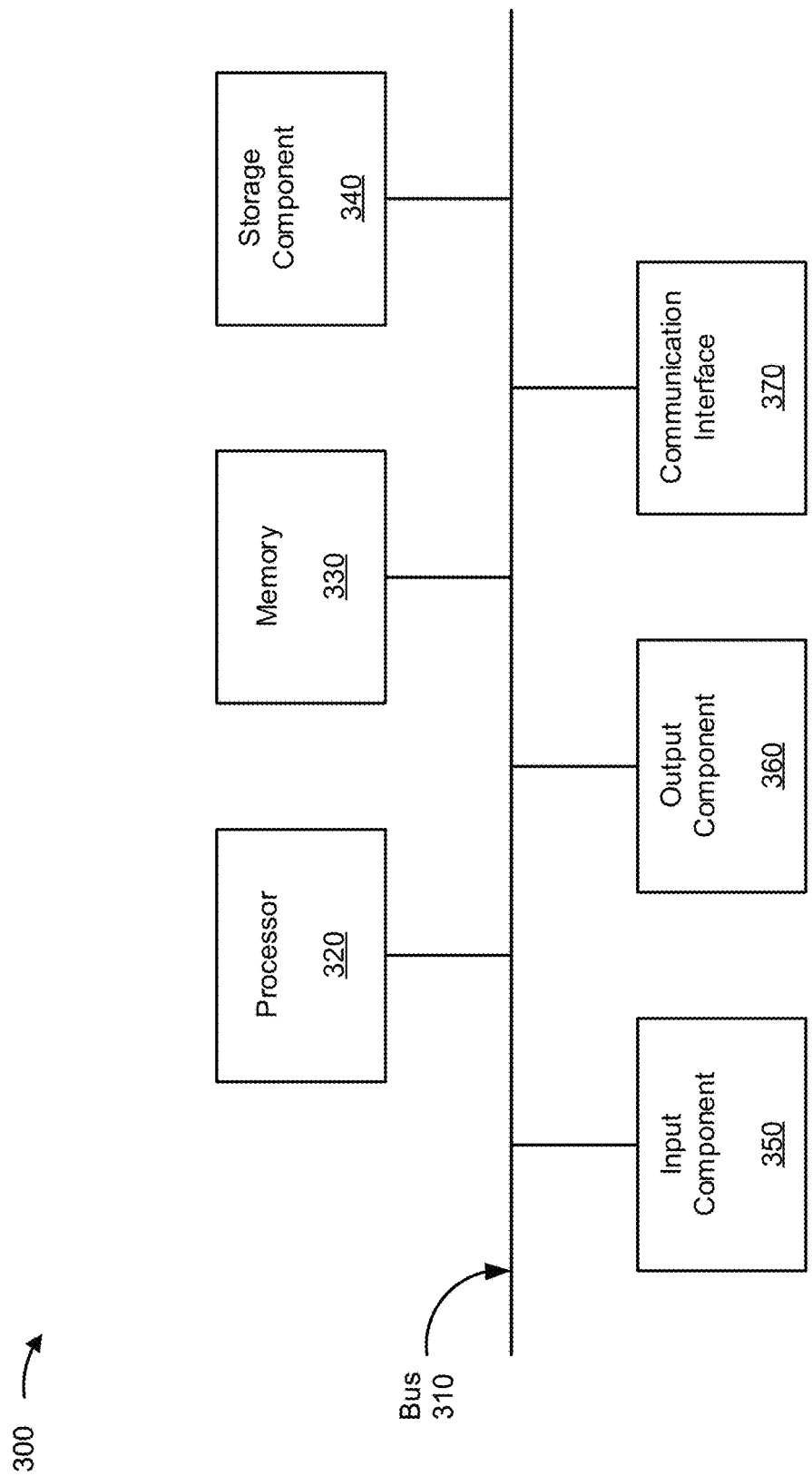
FIG. 3 is a diagram of example components of one or more devices of FIG. 2.

FIG. 3 is a diagram of example components of a device 300. Device 300 may correspond network node 210, network node controller 220, policy device 230, and/or connected device 240. In some implementations network node 210, network node controller 220, policy device 230, and/or connected device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
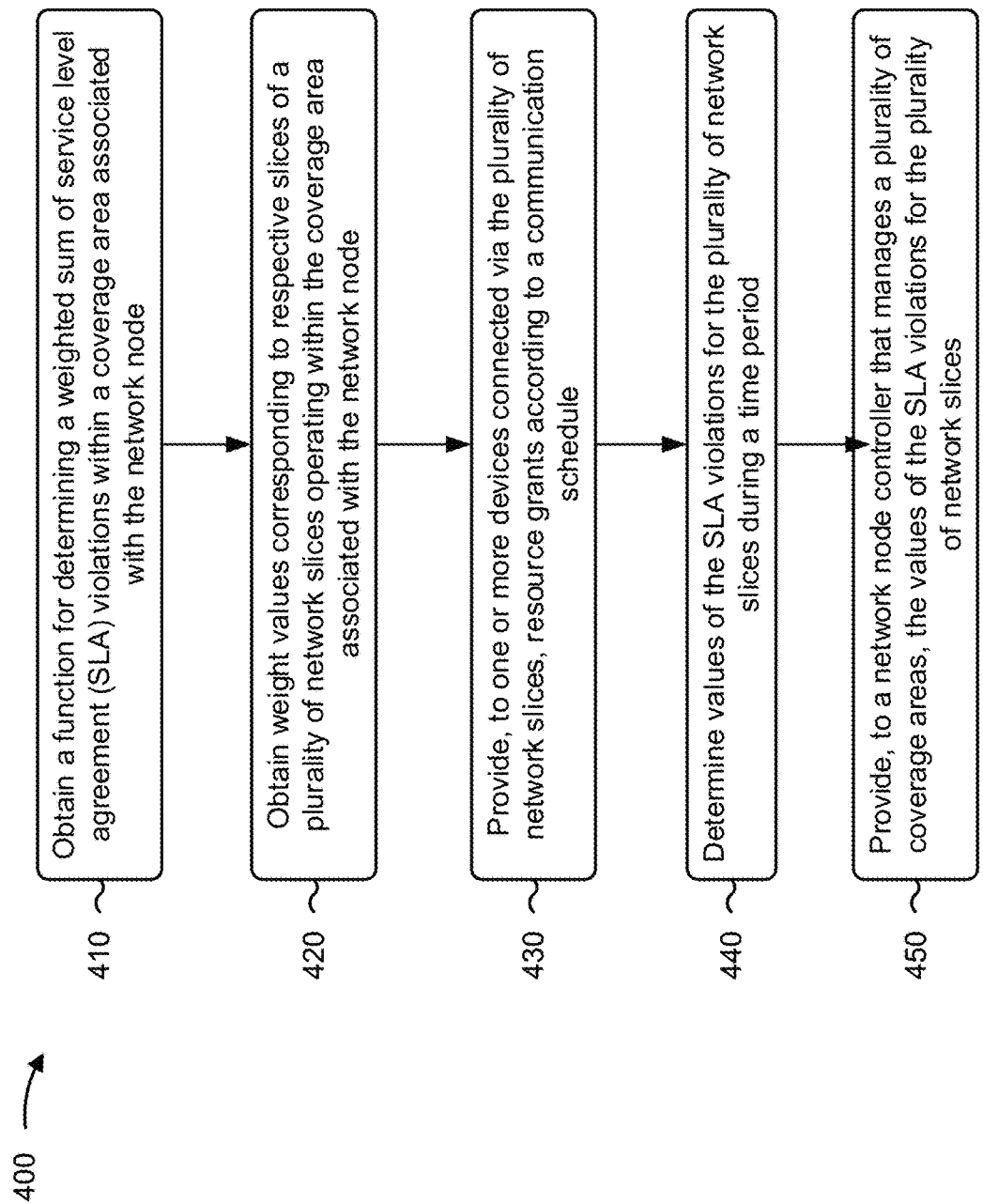
FIGS. 4 and 5 are flow charts of example processes for managing service level agreements over network slices.

FIG. 4 is a flow chart of an example process 400 for managing SLAs over network slices. In some implementations, one or more process blocks of FIG. 4 may be performed by a network node (e.g., network node 210 and/or network node 106). In some implementations, one or more process blocks of FIG. 4 may be performed by another device or a group of devices separate from or including the network node, such as a network node controller (e.g., network node controller 220), a policy device (e.g., policy device 230 and/or policy device 102), a connected device (e.g., connected device(s) 240 and/or one or more connected devices 108), and/or the like. The network node or another device or group of devices may perform one or more process blocks of FIG. 4 using one or more of processor 320, memory 330, storage component 340, input component 350, output component 360, communication interface 370 and/or the like.

As shown in FIG. 4, process 400 may include obtaining a function for determining a weighted sum of SLA violations within a coverage area associated with the network node (block 410). For example, the network node may obtain a function for determining a weighted sum of SLA violations within a coverage area associated with the network node, as described above. A first network slice of the plurality of network slices may have a first SLA that is different from a second SLA of a second network slice of the plurality of network slices.

As further shown in FIG. 4, process 400 may include obtaining weight values corresponding to respective slices of a plurality of network slices operating within the coverage area associated with the network node (block 420). For example, the network node may obtain weight values corresponding to respective slices of a plurality of network slices operating within the coverage area associated with the network node, as described above. In some implementations, the weight values are to be used in the function to weight the SLA violations in the plurality of network slices based on priorities of satisfying SLAs by the plurality of network slices.

In some implementation, a first weight value for a particular network slice of the plurality of network slices within the coverage area may be different from a second weight value for the particular network slice of the plurality of network slices within a different coverage area of the plurality of coverage areas.

As further shown in FIG. 4, process 400 may include providing, to one or more devices connected via the plurality of network slices, resource grants according to a communication schedule (block 430). For example, the network node may provide, to one or more devices connected via the plurality of network slices, resource grants according to a communication schedule, as described above. In some implementations, the communication schedule is determined to minimize the weighted sum of the SLA violations.

As further shown in FIG. 4, process 400 may include determining values of the SLA violations for the plurality of network slices during a time period (block 440). For example, the network node may determine, after a time period, values of the SLA violations for the plurality of network slices during a time period, as described above.

In some implementations, process 400 may include modifying a subsequent communication schedule, based on the values of the SLA violations for the plurality of network slices during the time period, to minimize the weighted sum of SLA violations for a subsequent time period.

In some implementations, process 400 may include replacing one or more of the weight values with one or more increased weight values based on satisfying a threshold quantity of SLA violations for the plurality of network slices during an interval of time.

As further shown in FIG. 4, process 400 may include providing, to a network node controller that manages a plurality of coverage areas including the coverage area associated with the network node, the values of the SLA violations for the plurality of network slices (block 450). For example, the network node may provide, to a network node controller that manages a plurality of coverage areas including the coverage area associated with the network node, the values of the SLA violations for the plurality of network slices, as described above.

Process 400 may further comprise obtaining, from the network node controller and based on the values of the SLA violations for the plurality of network slices, one or more updated weight values to replace the weight values in the function, to change respective weights of the plurality of network slices.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
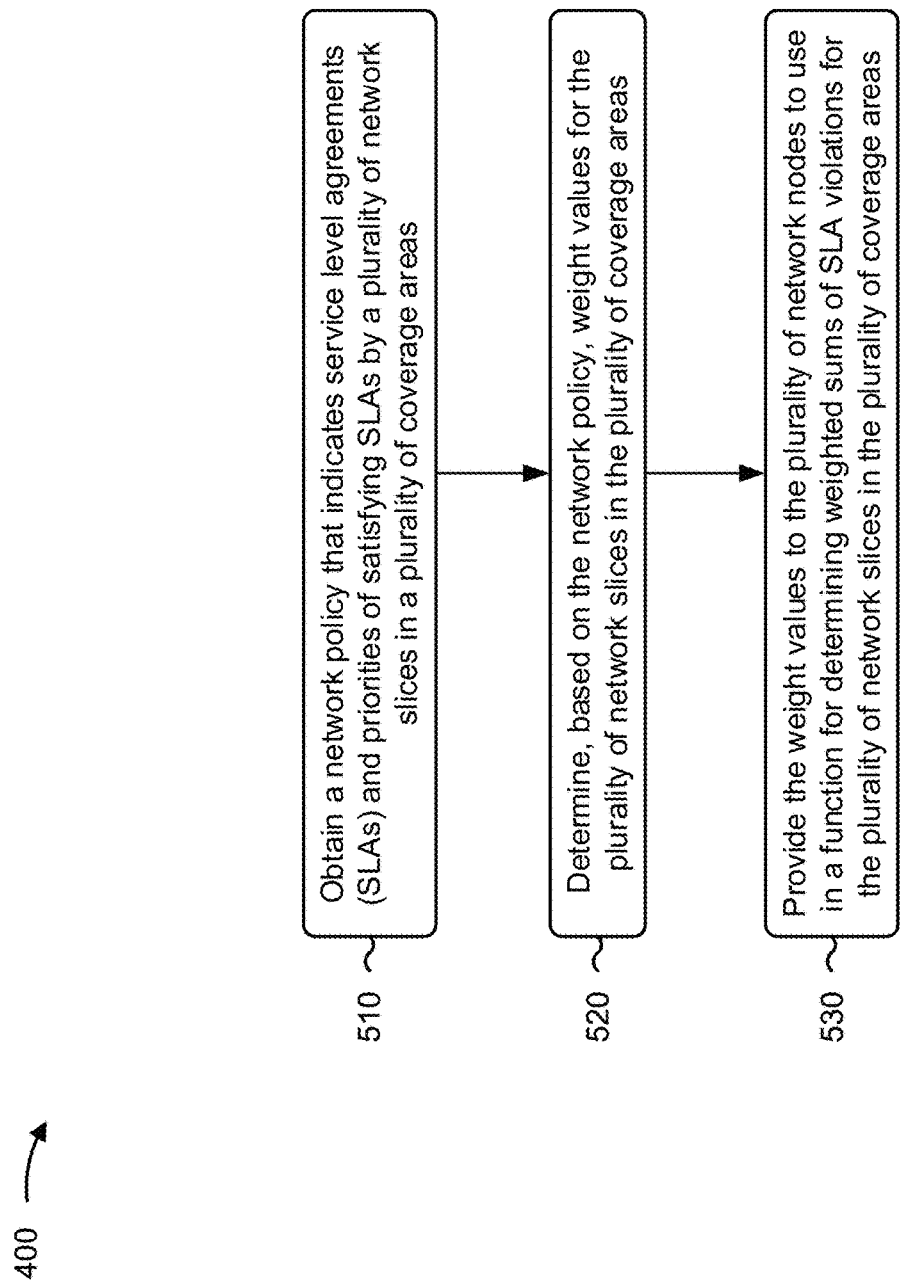

FIG. 5 is a flow chart of an example process 500 for managing SLAs over network slices. In some implementations, one or more process blocks of FIG. 5 may be performed by a network node controller (e.g., network node controller 220 and/or network node controller 104). In some implementations, one or more process blocks of FIG. 5 may be performed by another device or a group of devices separate from or including the network node controller, such as a network node (e.g., network node 210 and/or network node 106) a policy device (e.g., policy device 230 and/or policy device 102), a connected device (e.g., connected device(s) 240 and/or one or more connected devices 108), and/or the like. The network node or another device or group of devices may perform one or more process blocks of FIG. 5 using one or more of processor 320, memory 330, storage component 340, input component 350, output component 360, communication interface 370 and/or the like.

As shown in FIG. 5, process 500 may include obtaining a network policy that indicates SLAs and priorities of satisfying SLAs by a plurality of network slices in a plurality of coverage areas (block 510). For example, the network node controller may obtain a network policy that indicates SLAs and priorities of satisfying SLAs by a plurality of network slices in a plurality of coverage areas, as described above. In some implementations, a coverage region comprises the plurality of coverage areas. In some implementations, a plurality of network nodes manage the plurality of coverage areas.

In some implementations, a first network slice of the plurality of network slices has a first SLA that is different from a second SLA of a second network slice of the plurality of network slices.

One or more of the SLAs may define a threshold portion of timing intervals during which communication links, using a particular network slice of the plurality of network slices, satisfy a target service standard. In some implementations, failing to satisfy the target service standard for the threshold portion of a particular timing interval may be defined as an SLA violation.

One or more of the SLAs may define a threshold portion of communication links, using a particular slice of the one or more slices, that satisfy a target service standard during a timing interval. In some implementations, failing to satisfy the target service standard for the threshold portion of communication links during the timing interval may be defined as an SLA violation.

As further shown in FIG. 5, process 500 may include determining, based on the network policy, weight values for the plurality of network slices in the plurality of coverage areas (block 520). For example, the network node may determine, based on the network policy, weight values for the plurality of network slices in the plurality of coverage areas, as described above. In some implementations, the weight values are to weight SLA violations in respective network slices of the plurality of network slices in the plurality of coverage areas based on priorities of satisfying SLAs by the plurality of network slices. In some implementations, the weight values are determined to minimize a total weighted sum of SLA violations for the coverage region.

Process 500 may further comprise obtaining a function for determining the total weighted sum of SLA violations for the coverage region. The function may comprise coverage region weight values for respective network slices of the plurality of network slices. In some implementations, process 500 further includes determining the weight values for the plurality of network slices in the plurality of coverage areas to minimize the function for determining the total weighted sum of SLA violations for the coverage region.

In some implementations, a first weight value for a particular network slice of the plurality of network slices within a first coverage area is different from a second weight value for the particular network slice of the plurality of network slices within a second coverage area.

As further shown in FIG. 5, process 500 may include providing the weight values to the plurality of network nodes to use in a function for determining weighted sums of SLA violations for the plurality of network slices in the plurality of coverage areas (block 530). For example, the network node controller may provide the weight values to the plurality of network nodes to use in a function for determining weighted sums of SLA violations for the plurality of network slices in the plurality of coverage areas, as described above.

Process 500 may include receiving, from one or more of the plurality of network nodes and after a time period, values of the SLA violations for the plurality of network slices in the plurality of coverage areas. Process 500 may further include providing, to the one or more of the plurality of network nodes and based on the values of the SLA violations, one or more updated weight values to replace the weight values to change respective weights of the plurality of network slices.

Process 500 may include additional implementations, such as any single implementation or any combination of implementations described below and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like, depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a network node, a function for determining a weighted sum of service level agreement (SLA) violations within a coverage area associated with the network node;
   obtaining, by the network node, weight values corresponding to respective network slices of a plurality of network slices operating within the coverage area associated with the network node;
   providing, by the network node and to one or more devices connected via the plurality of network slices, resource grants according to a communication schedule;
   determining, by the network node, values of the SLA violations for the plurality of network slices during a time period; and
   providing, by the network node and to a network node controller that manages a plurality of coverage areas including the coverage area associated with the network node, the values of the SLA violations for the plurality of network slices.

2. The method of claim 1, further comprising obtaining, from the network node controller and based on the values of the SLA violations for the plurality of network slices, one or more updated weight values, to change respective weights of the plurality of network slices.

3. The method of claim 1, wherein the weight values are to be used in the function to weight the SLA violations in the plurality of network slices based on priorities of satisfying SLAs by the plurality of network slices.

4. The method of claim 1, wherein the communication schedule is determined to minimize the weighted sum of the SLA violations.

5. The method of claim 1, further comprising modifying a subsequent communication schedule, based on the values of the SLA violations for the plurality of network slices during the time period, to minimize the weighted sum of SLA violations for a subsequent time period.

6. The method of claim 1, further comprising replacing one or more of the weight values with one or more increased weight values based on satisfying a threshold quantity of SLA violations for the plurality of network slices during an interval of time.

7. A network node, comprising:
   one or more memories; and
   one or more processors, communicatively coupled to the one or more memories, configured to:
     obtain a function for determining a weighted sum of service level agreement (SLA) violations within a coverage area associated with the network node;
     obtain weight values corresponding to respective network slices of a plurality of network slices operating within the coverage area associated with the network node;
     provide, to one or more devices connected via the plurality of network slices, resource grants according to a communication schedule;
     provide, to a network node controller that manages a plurality of coverage areas including the coverage area associated with the network node, one or more indications of values of the SLA violations for the plurality of network slices during a time period; and
     obtain, from the network node controller and based on the values of the SLA violations for the plurality of network slices, one or more updated weight values to replace the weight values in the function.

8. The network node of claim 7, wherein a first network slice of the plurality of network slices has a first SLA that is different from a second SLA of a second network slice of the plurality of network slices.

9. The network node of claim 7, wherein the network node comprises a scheduler configured to determine the communication schedule for communications via the plurality of network slices.

10. The network node of claim 7, wherein the plurality of network slices comprise network slices operating according to a fifth generation new radio protocol.

11. The network node of claim 7, wherein a first weight value for a particular network slice of the plurality of network slices within the coverage area associated with the network node is different from a second weight value for the particular network slice of the plurality of network slices within a different coverage area of the plurality of coverage areas.

12. The network node of claim 7, wherein one or more of the SLAs define a threshold portion of timing intervals during which communication links, using a particular network slice of the plurality of network slices, satisfy a target service standard, and
   wherein failing to satisfy the target service standard for the threshold portion of a particular timing interval is defined as an SLA violation.

13. The network node of claim 7, wherein one or more of the SLAs define a threshold portion of communication links, using a particular slice of the one or more slices, that satisfy a target service standard during a timing interval, and
   wherein failing to satisfy the target service standard for the threshold portion of communication links during the timing interval is defined as an SLA violation.

14. A non-transitory computer-readable medium storing instructions, the instructions comprising:
   one or more instructions that, when executed by one or more processors, cause the one or more processors to:

obtain a network policy that indicates service level agreements (SLAs) and priorities of satisfying SLAs by a plurality of network slices in a plurality of coverage areas;

obtain a function for determining a total weighted sum of SLA violations for a coverage region that comprises the plurality of coverage areas;

determine, based on the network policy and the total weighted sum of SLA violations for the coverage region and for the plurality of network slices in the plurality of coverage areas, weight values to weight SLA violations in respective network slices of the plurality of network slices in the plurality of coverage areas based on priorities of satisfying SLAs by the plurality of network slices; and provide the weight values to a plurality of network nodes to use in a function for determining weighted sums of SLA violations for the plurality of network slices in the plurality of coverage areas.

15. The non-transitory computer-readable medium of claim 14, wherein the one or more instructions, when executed by one or more processors, wherein the function comprises coverage region weight values for respective network slices of the plurality of network slices, and wherein the one or more instructions, when executed by one or more processors, cause the one or more processors to determine the weight values for the plurality of network slices in the plurality of coverage areas to minimize the function for determining the total weighted sum of SLA violations for the coverage region.

16. The non-transitory computer-readable medium of claim 14, wherein the one or more instructions, when executed by one or more processors, cause the one or more processors to:

receive, from one or more of the plurality of network nodes and after a time period, values of the SLA violations for the plurality of network slices in the plurality of coverage areas; and provide, to the one or more of the plurality of network nodes and based on the values of the SLA violations, one or more updated weight values to replace the weight values to change respective weights of the plurality of network slices.

17. The non-transitory computer-readable medium of claim 14, wherein a first network slice of the plurality of network slices has a first SLA that is different from a second SLA of a second network slice of the plurality of network slices.

18. The non-transitory computer-readable medium of claim 14, wherein a first weight value for a particular network slice of the plurality of network slices within a first coverage area is different from a second weight value for the particular network slice of the plurality of network slices within a second coverage area.

19. The non-transitory computer-readable medium of claim 14, wherein one or more of the SLAs define a threshold portion of timing intervals during which communication links, using a particular network slice of the plurality of network slices, satisfy a target service standard, and wherein failing to satisfy the target service standard for the threshold portion of a particular timing interval is defined as an SLA violation.

20. The non-transitory computer-readable medium of claim 14, wherein one or more of the SLAs define a threshold portion of communication links, using a particular slice of the one or more slices, that satisfy a target service standard during a timing interval, and wherein failing to satisfy the target service standard for the threshold portion of communication links during the timing interval is defined as an SLA violation.

* * * * *